(12) United States Patent
Kettner et al.

(10) Patent No.: US 8,784,989 B2
(45) Date of Patent: Jul. 22, 2014

(54) SEALANT COMPOSITIONS HAVING A NOVEL PLASTICIZER

(75) Inventors: Mark R Kettner, Kingsport, TN (US); Martin James Stimpson, Marlborough (GB); Mark Stephen Holt, Huntersville, NC (US); Russell Lynn Whitson, Kingsport, TN (US); James Duncan Pont, Jonesborough, TN (US)

(73) Assignee: Eastman Chemical Company, Kingsport, TN (US)

( * ) Notice: Subject to any disclaimer, the term of this patent is extended or adjusted under 35 U.S.C. 154(b) by 559 days.

(21) Appl. No.: 11/846,953

(22) Filed: Aug. 29, 2007

(65) Prior Publication Data

US 2008/0057317 A1    Mar. 6, 2008

Related U.S. Application Data

(60) Provisional application No. 60/841,071, filed on Aug. 30, 2006.

(51) Int. Cl.
  *B32B 27/06* (2006.01)
  *B32B 27/08* (2006.01)
  *B32B 27/36* (2006.01)

(52) U.S. Cl.
  CPC ...................................... *B32B 27/08* (2013.01)
  USPC ..................... 428/411.1; 156/329; 428/423.1; 523/122; 524/296

(58) Field of Classification Search
  CPC ...................................... B32B 27/08
  USPC ......... 428/411.1, 423.1, 446; 156/329, 331.7, 156/332; 523/411.122; 524/296, 297
  See application file for complete search history.

(56) References Cited

U.S. PATENT DOCUMENTS

| | | | |
|---|---|---|---|
| 2,217,163 A | 10/1940 | Fletcher | |
| 2,360,306 A | 10/1944 | Nason | |
| 2,459,955 A | 1/1949 | Morrison et al. | |
| 2,628,207 A | 2/1953 | Smith et al. | |
| 3,224,995 A | 12/1965 | Pree | |
| 3,431,239 A | 3/1969 | Morris et al. | |
| 3,725,311 A | 4/1973 | Grubb | |
| 3,764,374 A | 10/1973 | Barton et al. | |
| 4,015,044 A | 3/1977 | Ranney et al. | |
| 4,082,712 A | 4/1978 | Dannels | |
| 4,110,261 A | 8/1978 | Newland | |
| 4,221,688 A | 9/1980 | Johnson et al. | |
| 4,253,898 A | 3/1981 | Rinker et al. | |
| 4,331,579 A | 5/1982 | Haemer | |
| 4,362,783 A * | 12/1982 | Graham | 428/338 |
| 4,366,307 A | 12/1982 | Singh et al. | |
| 4,376,144 A | 3/1983 | Goettler | |
| 4,401,720 A | 8/1983 | Davis et al. | |
| 4,414,267 A | 11/1983 | Coran et al. | |
| 4,515,909 A | 5/1985 | Sawano et al. | |
| 4,562,173 A | 12/1985 | Terano et al. | |
| 4,599,376 A | 7/1986 | Takimoto et al. | |
| 4,605,465 A | 8/1986 | Morgan | |
| 4,654,390 A | 3/1987 | Siegel | |
| 4,666,765 A * | 5/1987 | Caldwell et al. | 442/85 |
| 4,764,449 A | 8/1988 | Vanlseghem | |
| 4,792,464 A | 12/1988 | Martenson | |
| 4,806,590 A | 2/1989 | Padget et al. | |
| 4,900,771 A | 2/1990 | Gerace et al. | |
| 4,975,480 A | 12/1990 | Bullen | |
| 5,071,690 A | 12/1991 | Fukuda et al. | |
| 5,179,138 A | 1/1993 | Uemura et al. | |
| 5,236,883 A | 8/1993 | Nakazawa et al. | |
| 5,288,797 A | 2/1994 | Khalil et al. | |
| 5,326,845 A | 7/1994 | Linden | |
| 5,338,788 A | 8/1994 | Miyataka et al. | |
| 5,366,550 A | 11/1994 | Schad | |
| 5,401,708 A | 3/1995 | Shimizu et al. | |
| 5,432,222 A | 7/1995 | Igarashi et al. | |
| 5,454,801 A | 10/1995 | Lauritzen | |
| 5,476,889 A | 12/1995 | Owen | |
| 5,489,618 A | 2/1996 | Gerkin | |
| 5,492,960 A | 2/1996 | Muehlbauer et al. | |
| 5,494,707 A | 2/1996 | Wang et al. | |
| 5,519,072 A | 5/1996 | Wieczorek, Jr. et al. | |
| 5,523,344 A | 6/1996 | Maksymkiw et al. | |
| 5,534,609 A | 7/1996 | Lewis et al. | |
| 5,535,469 A | 7/1996 | Terry | |
| 5,539,011 A | 7/1996 | Hilker et al. | |
| 5,559,175 A | 9/1996 | Kroggel et al. | |
| 5,571,860 A | 11/1996 | Kukkala et al. | |
| 5,659,001 A | 8/1997 | Habimana et al. | |

(Continued)

FOREIGN PATENT DOCUMENTS

| | | | |
|---|---|---|---|
| CA | 2 485 133 A1 | 11/2003 | |
| CA | 2 624 332 A1 | 4/2007 | |

(Continued)

OTHER PUBLICATIONS

PCT International Search Report and Written Opinion with Mail Date of Jan. 25, 2008 for PCT/US2007/019060 Application.

(Continued)

*Primary Examiner* — Terressa Boykin

(74) *Attorney, Agent, or Firm* — William K. McGreevey

(57) ABSTRACT

A sealant composition having from about 0.1 to about 90 weight % of a polymer selected from the group consisting of butyls, acrylics, urethanes, polysulfides, and silicone modified polymers, and at least one $C_4$ to $C_8$ alkyl terephthalate.

39 Claims, 3 Drawing Sheets

(56) References Cited

U.S. PATENT DOCUMENTS

| | | | |
|---|---|---|---|
| 5,670,225 A | 9/1997 | Yamanaka et al. |
| 5,681,631 A | 10/1997 | Steelman et al. |
| 5,698,621 A | 12/1997 | Nguyen et al. |
| 5,750,278 A | 5/1998 | Gillett et al. |
| 5,767,174 A | 6/1998 | Nakagawa et al. |
| 5,869,589 A | 2/1999 | Raynolds et al. |
| 5,877,268 A | 3/1999 | Jorgenson et al. |
| RE36,233 E | 6/1999 | Hilker et al. |
| 5,919,716 A | 7/1999 | Raynolds et al. |
| 6,034,168 A | 3/2000 | Wang |
| 6,127,026 A | 10/2000 | Bonk et al. |
| 6,136,884 A | 10/2000 | Chen et al. |
| 6,136,900 A | 10/2000 | Kuhn et al. |
| 6,187,125 B1 | 2/2001 | Rustad et al. |
| 6,221,991 B1 | 4/2001 | Letchford et al. |
| 6,231,849 B1 | 5/2001 | Schiller |
| 6,235,830 B1 | 5/2001 | Ohmori et al. |
| 6,245,437 B1 | 6/2001 | Shiiki et al. |
| 6,284,077 B1 | 9/2001 | Lucas et al. |
| 6,299,864 B1 | 10/2001 | Chen et al. |
| 6,303,184 B1 | 10/2001 | Lobo et al. |
| 6,323,275 B2 | 11/2001 | Takahashi et al. |
| 6,391,405 B1 | 5/2002 | Bonk et al. |
| 6,414,044 B2 | 7/2002 | Taylor |
| 6,414,077 B1 | 7/2002 | Barron et al. |
| 6,433,097 B1 | 8/2002 | Nixon et al. |
| 6,437,071 B1 | 8/2002 | Odaka et al. |
| 6,479,584 B1 | 11/2002 | Nakagawa et al. |
| 6,582,786 B1 | 6/2003 | Bonk et al. |
| 6,630,534 B1 | 10/2003 | Tanaka et al. |
| 6,638,992 B1 | 10/2003 | Chen et al. |
| 6,656,988 B1 | 12/2003 | Fischer et al. |
| 6,656,998 B1 | 12/2003 | Robeson et al. |
| 6,670,419 B2 | 12/2003 | Lau |
| 6,675,560 B2 | 1/2004 | Gott et al. |
| 6,706,399 B1 | 3/2004 | George et al. |
| 6,749,836 B1 | 6/2004 | Chen et al. |
| 6,749,861 B2 | 6/2004 | Mullen |
| 6,750,278 B2 | 6/2004 | Patil et al. |
| 6,762,239 B1 | 7/2004 | Williams |
| 6,784,240 B2 | 8/2004 | Hasegawa et al. |
| 6,803,403 B2 | 10/2004 | Ishihara |
| 6,809,147 B1 | 10/2004 | Ohno et al. |
| 6,825,278 B2 | 11/2004 | Holub et al. |
| 6,833,423 B2 | 12/2004 | Roesler |
| 6,849,657 B2 | 2/2005 | Elworthy et al. |
| 6,855,765 B2 | 2/2005 | Chew et al. |
| 6,858,260 B2 | 2/2005 | Taylor et al. |
| 6,864,317 B1 | 3/2005 | Kitano et al. |
| 6,872,454 B2 | 3/2005 | Newberth, III et al. |
| 6,884,840 B2 | 4/2005 | Gleichenhagen et al. |
| 6,887,964 B2 | 5/2005 | Frisch |
| 6,896,736 B2 | 5/2005 | Lee et al. |
| 6,900,265 B2 | 5/2005 | Schultz et al. |
| 6,933,350 B1 | 8/2005 | Nakagawa et al. |
| 6,946,509 B2 | 9/2005 | He |
| 6,958,149 B2 | 10/2005 | Vukicevic et al. |
| 6,960,619 B2 | 11/2005 | Figovsky et al. |
| 6,964,999 B1 | 11/2005 | Nakagawa et al. |
| 6,977,277 B2 | 12/2005 | Patil et al. |
| 6,979,716 B1 | 12/2005 | Nakagawa et al. |
| 7,005,095 B2 * | 2/2006 | Haga ............................ 264/135 |
| 7,012,148 B2 | 3/2006 | Curphey |
| 7,019,068 B2 | 3/2006 | Boadart et al. |
| 7,208,464 B2 | 4/2007 | Heltovics et al. |
| 7,361,779 B1 | 4/2008 | Holt et al. |
| 2003/0074833 A1 | 4/2003 | Wood et al. |
| 2004/0097625 A1 | 5/2004 | Bodart et al. |
| 2005/0020718 A1 | 1/2005 | Gosse et al. |
| 2005/0262758 A1 | 12/2005 | Allison et al. |
| 2006/0106168 A1 | 5/2006 | Ota et al. |
| 2006/0276339 A1 | 12/2006 | Windsor et al. |
| 2007/0012140 A1 | 1/2007 | Howlett et al. |
| 2007/0037926 A1 | 2/2007 | Olsen et al. |
| 2007/0110791 A1 | 5/2007 | Myhra |
| 2007/0128148 A1 | 6/2007 | Whitehead et al. |
| 2007/0172382 A1 | 7/2007 | Uchiyama et al. |
| 2007/0179229 A1 | 8/2007 | Grass |
| 2007/0230189 A1 | 10/2007 | Gruenbacher et al. |
| 2008/0054089 A1 | 3/2008 | Oldfield et al. |
| 2008/0057317 A1 | 3/2008 | Kettner et al. |
| 2008/0058450 A1 | 3/2008 | Stimpson et al. |

FOREIGN PATENT DOCUMENTS

| | | |
|---|---|---|
| CA | 2 595 012 A1 | 2/2008 |
| CN | 1651229 A | 8/2005 |
| DE | 44 15 888 A1 | 11/1994 |
| DE | 100 16 086 A1 | 10/2000 |
| DE | 102006001795 A1 | 7/2007 |
| EP | 0 397 245 A2 | 11/1990 |
| GB | 851 753 | 10/1960 |
| GB | 985143 | 3/1965 |
| JP | 50-055649 A | 5/1975 |
| JP | 5055649 A | 5/1975 |
| JP | 53-117035 A | 10/1978 |
| JP | 53117035 A | 10/1978 |
| JP | 55-021446 | 2/1980 |
| JP | 63-075050 | 4/1988 |
| JP | 64-45452 A | 2/1989 |
| JP | 05-262942 | 10/1993 |
| JP | 06-258772 A | 9/1994 |
| JP | 07-286153 A | 10/1995 |
| JP | 08 020668 A | 1/1996 |
| JP | 8-020668 A | 1/1996 |
| JP | 2002-234983 | 8/2002 |
| JP | 2003-301082 | 10/2003 |
| JP | 2006 193603 | 7/2006 |
| WO | 91/17302 A1 | 11/1991 |
| WO | WO 91/17302 A1 | 11/1991 |
| WO | WO 92/18601 A1 | 10/1992 |
| WO | 03029339 A1 | 4/2003 |
| WO | WO 03029339 A1 | 4/2003 |

OTHER PUBLICATIONS

PCT International Search Report and Written Opinion with Mail Date of Jan. 31, 2008 for PCT/US2007/019004 Application.
PCT International Search Report and Written Opinion with Mail Date of Feb. 26, 2008 for PCT/US2007/019003 Application.
Co-pending U.S. Appl. No. 11/846,971, filed Aug. 29, 2007; now published as US 2008/0058450 A1.
Co-pending U.S. Appl. No. 11/846,968, filed Aug. 29, 2007; now published as US 2008/0054089 A1.
Co-pending U.S. Appl. No. 11/202,543, filed Aug. 12, 2005; now published as US 2007/0037926 A1.
Office Action with Mail Date of Jan. 23, 2008 for co-pending U.S. Appl. No. 11/202,543, Olsen et al.
Office Action with Mail Date of Oct. 29, 2008 for co-pending U.S. Appl. No. 11/202,543, Olslen et al.
Beeler, A. Don; "Terephthalate Esters A New Class of Plasticizers for Polyvinyl Chloride"; Society of Plastics Engineers; 34th Annual Technical Conference; Chalfonte-Haddon Hall, Atlantic City, New Jersey; Apr. 26-29, 1976.
Hansen, C.M.; "Hansen Solubility Parameters—A User's Handbook"; pp. 9-10, 167-185; CRC Press, Boca Raton, FL, Date: 2000.
Herman, Stephen J.; Edited by David Rowe; "Chemistry and Technology of Flavors and Fragrance", "Chapter 13, Applications II: Fragrance"; Blackwell Publishing (2004); pp. 310.
Notification of Transmittal of the International Search Report and Written Opinion of the International Searching Authority, or the Declaration date of mailing Dec. 27, 2006 in International Application No. PCT/US2006/031465.
Office Action with Mail Date of Apr. 30, 2009 for co-pending U.S. Appl. No. 11/202,543, Olsen et al.
Office Action with Notification Date of Jan. 4, 2010 for co-pending U.S. Appl. No. 11/202,543.
Office Action with Notification Date of Mar. 29, 2010 for co-pending U.S. Appl. No. 11/846,971.
Office Action with Mail Date of Apr. 9, 2009 for U.S. Appl. No. 11/846,968.

(56) References Cited

OTHER PUBLICATIONS

Office Action with Notification Date of Dec. 3, 2009 for U.S. Appl. No. 11/846,968.
Science Lab.com, MSDS-Dibutyl-phthalate-9927152 section 1 (Oct. 10, 2005 updated Nov. 6, 2008).
United Nations Environment Programme, Geneva, 1997 Env Health Criteria No. 189, p. 20/129, Section 3.2.2—Di-n-butyl Phthalate.
Vandezande, et al.; "Chapter 16—Vinyl Acetate Polymerization," Emulsion Polymerization and Emulsion Polymers; 1997; pp. 563-587; John Wiley & Sons Ltd.
Daniels, W., "Vinyl Ester Polymers," Kirk-Othmer, Encyclopedia of Chemical Technology, pp. 393-425; vol. 17; John Wiley and Sons, New York.
Ramey, J. S. and Porter, R. A.; "Softening Aid, Flushing Agent, Viscosity Reducer: A Study of Plasticizers for Polyurethanes"; Polyurethane 1995; Sep. 26-29, 1995; pp. 216-223.
Office Action notification date Jul. 31, 2013 in co-pending U.S. Appl. No. 13/749,225.
Office Action notification date Feb. 7, 2014 in co-pending U.S. Appl. No. 13/749,225.

* cited by examiner

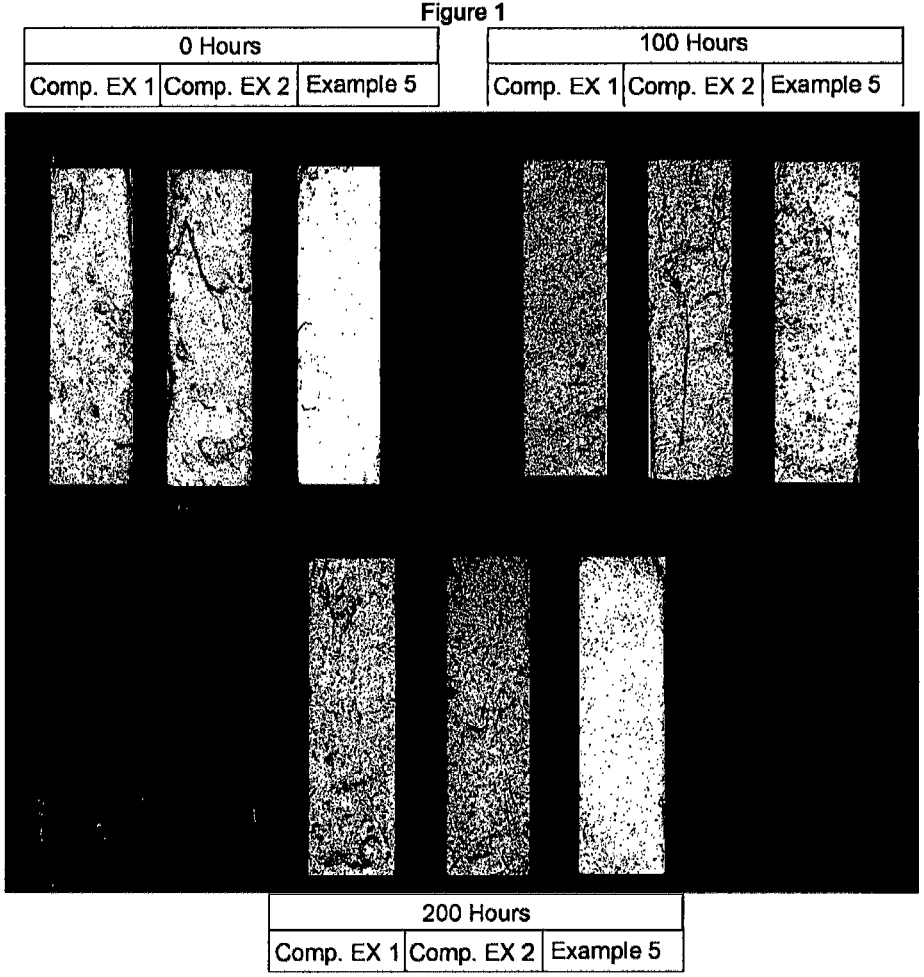

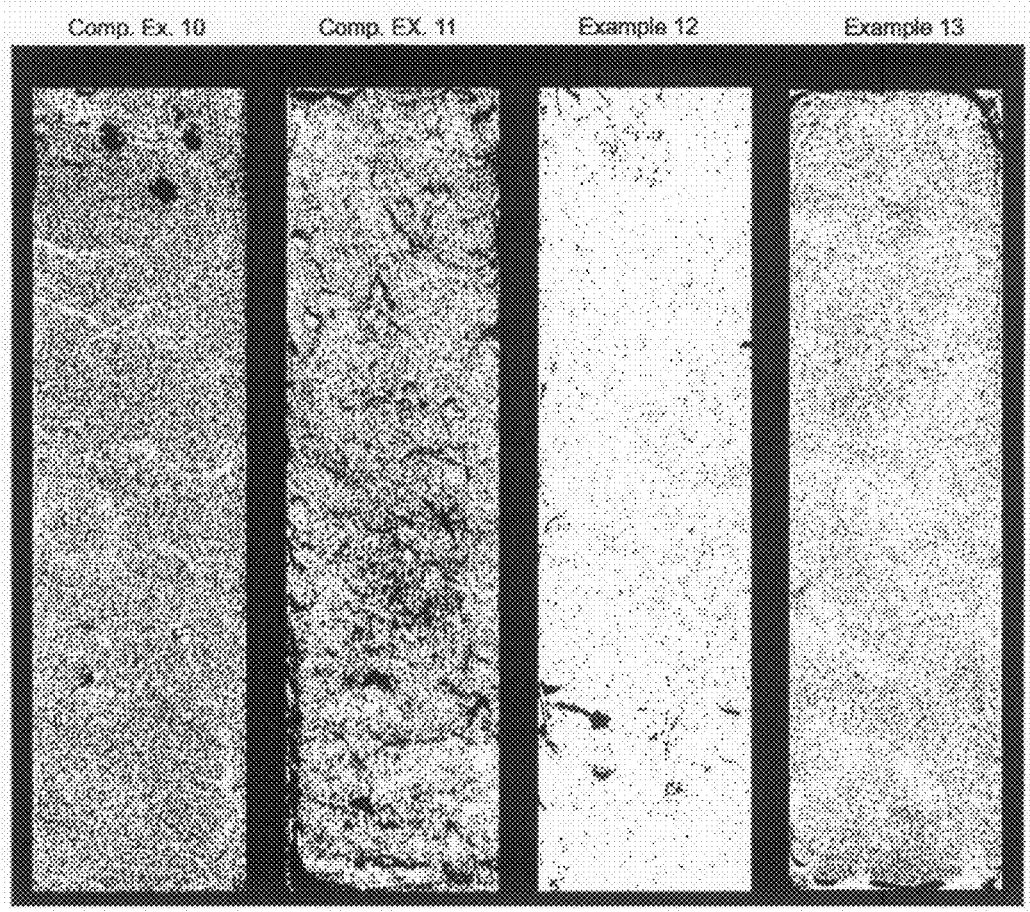

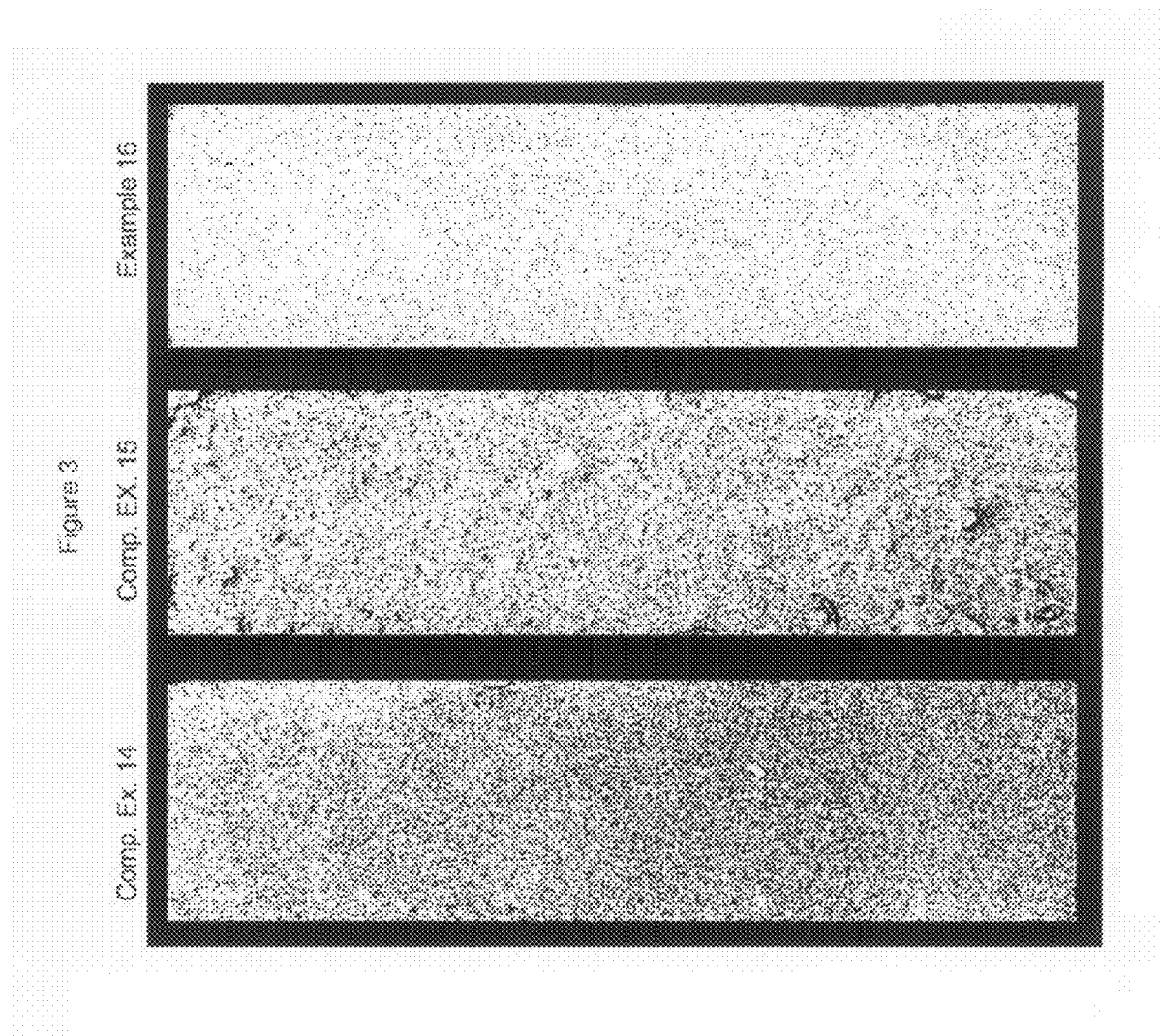

SEALANT COMPOSITIONS HAVING A NOVEL PLASTICIZER

CROSS REFERENCE TO RELATED APPLICATION

This application claims priority to U.S. Provisional Patent Application No. 60/841,071, filed Aug. 30, 2006.

FIELD OF THE INVENTION

The present invention relates to sealant compositions that include at least one polymer and at least one $C_4$ to $C_8$ alkyl terephthalate.

BACKGROUND OF THE INVENTION

Many polymeric materials are useful in sealants that are used, for example, to fill in cracks, crevices or gaps in structural units and to fill spaces between neighboring panels, joints or building units. In some cases they serve to prevent water, wind, dirt, or other contaminants from passing through openings or spaces such as joints or gaps. It is sometimes advantageous for sealants to be capable of absorbing shear, compression, and extension stresses exerted thereon caused by shifting movement of one or more structural units to which the sealants are attached (for example, due to shrinking or swelling brought on by variations in temperature, moisture, or wear). Sealant additives such as plasticizers are often used to adjust properties such as glass transition temperature, extrudability, cure hardness or elasticity. In some applications it is advantageous for a caulk or sealant to be capable of receiving paint. In some applications it is advantageous for a caulk or sealant to be capable of resisting pick-up (i.e. adhesion) of soil or dirt. There is a continuing need for plasticizers and other additives useful in sealant compositions to convey these favorable properties.

SUMMARY OF THE INVENTION

The present invention provides novel components for polymeric sealant compositions and compositions comprising the components. The component is one or more $C_4$ to $C_8$ alkyl terephthalates. In some embodiments, such materials enhance desired In some embodiments, these materials may simply serve as a low cost filler because they have a lower production cost than the polymeric sealant and do not compromise the beneficial properties of the polymeric sealant.

Thus, the invention provides self-curing sealant compositions that contain:
  at least one polymer,
  between about 25% and about 90% by weight, based on total weight of the composition, of a mineral filler, and
  at least one $C_4$ to $C_8$ alkyl terephthalate.
In some embodiments, the polymer is selected from acrylic polymers, polyurethanes or polyureas, and silane-modified polymers. In some embodiments, the $C_4$ to $C_8$ alkyl terephthalate used is di-n-butyl terephthalate. In some embodiments, the $C_4$ to $C_8$ alkyl terephthalate used is di-2-ethylhexyl terephthalate.

The invention further provides methods of sealing locations, in which a composition of the present invention is applied to such location.

The invention further provides articles that include or contain the compositions of the present invention.

The invention further provides methods of making compositions, in which the following components are combined:
  at least one polymer,
  between about 25% and about 90% by weight, based on total weight of the composition, of a mineral filler, and
  at least one $C_4$ to $C_8$ alkyl terephthalate.
In some embodiments, the polymer is selected from acrylic polymers, polyurethanes or polyureas, and silane-modified polymers. In some embodiments, the $C_4$ to $C_8$ alkyl terephthalate used is di-n-butyl terephthalate. In some embodiments, the $C_4$ to $C_8$ alkyl terephthalate used is di-2-ethylhexyl terephthalate.

BRIEF DESCRIPTIONS OF THE FIGURES

FIG. 1 is a photograph showing Dirt Pick-Up test results of sealant compositions of Comparative Examples 1 and 2 (abbreviated Comp. Ex 1 and Comp Ex 2, respectively) and Example 5. Samples at 0 hours aging, 100 hours aging, and 200 hours aging are depicted and labeled as such. Photographs were originally taken as digital color photographs and converted by electronic means to black and white to comply with patent filing requirements. Portions of image containing aluminum plates upon which samples rested were also removed through electronic means and replaced with black areas to match black background and to illustrate samples and the contrast between clean and soiled portions.

FIG. 2 is a photograph showing dirt pick-up test results of sealant compositions of Comparative Examples 10 and 11 (abbreviated Comp Ex 10 and Comp Ex. 11, respectively) and Examples 12 and 13. Photographs were originally taken as digital color photographs and converted by electronic means to black and white to comply with patent filing requirements. Portions of image containing aluminum plates upon which samples rested were also removed through electronic means and replaced with black areas to match black background and to illustrate samples and the contrast between clean and soiled portions.

FIG. 3 is a photograph showing dirt pick-up test results of sealant compositions of Comparative Examples 14 and 15 (abbreviated Comp Ex 14 and Comp Ex 15, respectively) and Example 16. Photographs were originally taken as digital color photographs and converted by electronic means to black and white to comply with patent filing requirements. Portions of image containing aluminum plates upon which samples rested were also removed through electronic means and replaced with black areas to match black background and to illustrate samples and the contrast between clean and soiled portions.

DETAILED DESCRIPTION OF THE INVENTION

The sealant compositions of the present invention comprise at least one polymer and at least one $C_4$ to $C_8$ alkyl terephthalate. The invention also provides methods for making and using the sealant compositions. In some embodiments the sealant is self-curing. In some embodiments, the composition comprises at least one mineral filler.

In some embodiments, the sealant compositions of the present invention comprise from about 0.1 to about 90 weight % of a polymer, and an aggregate amount of from about 0.01 to about 45 of at least one $C_4$ to $C_8$ alkyl terephthalate. In some embodiments, the sealant compositions of the present invention comprise from about 20 to about 60 weight % of a polymer, and an aggregate amount of from about 3 to about 25 weight % of at least one $C_4$ to $C_8$ alkyl terephthalate. In some embodiments, one are more terephthalates are used in an aggregate amount such as about 0.01 to about 40 weight %, about 40 to about 70 weight %, about 0.01 to about 30 weight %, about 0.01 to about 20 weight %, about 0.1 to about 15 weight %, about 0.1 to about 10 weight %, 0.1 to about 5 weight %, about 0.01 to about 3 weight %, about 3 to about 15 weight %, about 15 to about 25 weight %, about 5 to about 25 weight %, or about 0.01 to about 1 weight %, in each case the percentage being based on the total weight of the sealant. In some embodiments, the sealant compositions of the present invention comprise from about 25 to 40 weight % of a polymer, and from about 3 to about 15 weight % of a $C_4$ to $C_8$ alkyl terephthalate. In some embodiments, one the above weight ranges is present with between about 25% and about 90% by weight, based on total weight of the composition, of a mineral filler. In some embodiments, one the above weight ranges is present with between about 35% and about 70% by weight, based on total weight of the composition, of a mineral filler.

Sealants

As used throughout this application, a "sealant" shall mean any composition that can be used to form a connecting bond between two or more objects, articles or bodies or to fill at least a portion of any type of opening, junction or other space in, on or between one or more objects, articles or bodies (e.g. grooves, pits, cracks, joints, spaces between adjacent or overlapping members, pores, rivet holes and seams). Some sealants are used, for example, to fill a space defined by two or more overlapping or adjacent members of a structure, such as a joint around a window, a joint connecting or between parts of an aircraft or watercraft, or seams in a concrete or architectural member. In some embodiments, for example, sealants can be used to smooth a surface or to act as a caulk-like material to slow or stop movement of moisture, chemicals, gasses, debris, and other materials through or across an opening, junction or space, although the foregoing functions are not required properties of the sealant.

Sealant materials cure (i.e. solidify and harden) upon or after application through chemical or physical behavior of one or more components in the sealant. In some embodiments, the sealant is a self-curing sealant. A "self-curing sealant" is a sealant that cures upon application at room temperature (22 degrees C.) without further administration of heat or irradiation. Some examples include: emulsions of one or more polymers (e.g. acrylic polymers) in water or another solvent that cure through physical coalescence upon drying through evaporation; prepolymers that polymerize through reaction with atmospheric moisture or ambient water (e.g. isocyanate-terminated polyurethane or polyurea prepolymers); compositions containing two or more compounds that are combined to react with each other to cause the composition to cure (e.g. two-component polyurethane or polyurea sealants); and sealant compounds that react with materials in the substrates to which they are applied to bond to such materials (e.g. silane-terminated sealants having alkoxy groups that react with hydroxyl groups on substrates).

Sealants may be sold as one component or two or more components that are combined during application. An example of a two component sealant is a urethane sealant composition that provides one component having an isocyanate-capped urethane "prepolymer" and a second component containing a "chain extender" with two or more reactive hydrogen functionalities (for example hydroxy or amine moieties).

Polymers

As used throughout this application, the term "polymer" as used herein means a molecule that is the reaction product of polymerizing at least one type of monomer and, in the case where the polymer includes two or more types of monomers, the monomers may be arranged in any order and polymerized concurrently or sequentially. The polymers of the present invention can be a polyurethane or polyurea, acrylic polymer, silane-modified polymer, polysulfide, or combination of two or more of the foregoing. In some embodiments, the polymer is selected from: a polyurethane or polyurea; an acrylic polymer, or a silane-modified polymer. Thus, in some embodiments, the polymer is an acrylic polymer. In some embodiments the polymer is a polyurethane or polyurea. In some embodiments the polymer is a silane-modified polymer.

Polyurethanes

As used throughout this application, the term "polyurethane or polyurea" means any polymer having a structure that includes repeating urethane linkages, repeating urea linkages or both. Examples of such molecules include the reaction product of molecules that include at least one polyol or polyamine and at least one polyisocyanate and optionally one or more chain extenders, although the invention is not limited to polymers prepared by any specific reactions or set of reactions so long as the requisite urethane or urea linkages exist. As used throughout this application, the reference to a polymer or other molecule as the "reaction product" of specified reactants is provided as a convenient way to describe the structure of the molecule, and not as a limitation to molecules made by specific methods or using specific reactants. Thus, any molecule having the molecular structure described by reference to a reaction product, but obtained by other methods or from other reactants, will be within the meaning of "reaction product" as that term is used throughout this application. Further, the method or sequence of making such polymers is not critical. When the polyurethane or polyurea is described as a reaction product of a combination of one or more polyols, polyisocyanates and optional chain extenders, for example, the polyurethane or polyurea may be the reaction product of a one step batch polymerization, a two or more step process (such as a process in which a prepolymer is formed then reacted with a chain extender) or any other process that will produce the structure described. Similarly, the use of terms such as "chain extender" or "cross-linker" for convenience should not be interpreted as limiting polyurethanes or polyureas to compounds made by a process that includes a separate chain extension or cross-linking step.

The polyurethanes or polyureas may also include other recurring groups in addition to urethanes or ureas. For example, repeating groups such as polyethers, polyesters, and polycarbonates may exist, as in the case where such groups are present in polyols or polyamines that are used to make the polyurethane or polyurea. The polymer may also be the reaction product of molecules that include a molar excess of isocyanates, resulting in reaction of isocyanate groups with each other and with groups such as urethanes or ureas to form groups such as allophanate, biuret, uretdione, or cyanurate groups. The foregoing are only examples of other repeating groups that may appear in the polymer backbone. The polyurethanes or polyureas may also have any degree of branching or linearity as is desired.

The polyurethane or polyurea may be reaction product of molecules that include any useful combination of polyols, polyamines or both with polyisocyanates, and optionally other molecules. Some examples of polyisocyanates within the meaning of the invention include diisocyanates, triisocyanates and polymers of diisocyanates or triisocyanates having two or more isocyanate groups. Some examples include methylene diisocyanate, methylene diphenyl diisocyanate or "MDI" (including for example all MDI isomers such as 2,2'-methylene diphenyl diisocyanate, 2,4'-methylene diphenyl diisocyanate and 4,4'-methylene diphenyl diisocyanate), trimers and other polymers based on MDI, hydrogenated MDI, toluene diisocyanates or "TDI" (including all TDI isomers such as 2,4-toluene diisocyanate and 2,6-toluene diisocyanate), 3,4-dichlorophenyl diisocyanate, dicyclohexylmethane-4,4'-diisocyanate, 4,4'-tolidine diisocyanate, m-phenylene diisocyanate, 4-chloro-1,3-phenylene diisocyanate, 4,4-tetramethylene diisocyanate, 1,6-hexamethylene diisocyanate, 1,10-decamethylene diisocyanate, 1,4-cyclohexylene diisocyanate, α-phenylene diisocyanate, lysine alkyl ester diisocyanates, isophorone diisocyanate or "IPDI," 3,3'-dimethyl-4,4'-diphenylmethane diisocyanate, xylylene diisocyanate, tetramethylxylylene diisocyanate, dodecyl diisocyanate, 1,5-tetrahydronaphthalene diisocyanate, tolylene 2,4-diisocyanate, diphenylmethane 2,4'-diisocyanate, triisocyanatotoluene, methylenebis(cyclohexyl) 2,4'-diisocyanate, 4-methylcyclohexane 1,3-diisocyanate, naphthylene diisocyanate, phenylene 1,4-diisocyanate and adducts and trimers of diisocyanates, such as the adduct of trimethylolpropane and methylene diphenyl diisocyanate or toluene diisocyanate. Polyisocyanates that are derivatized (e.g. sulfonated isocyanates, blocked isocyanates, isocyanurates, biurets, isocyanate prepolymers), may also be used. Mixtures of polyisocyanates (including crude mixtures resulting from reaction used to produce polyisocyanates) can also be used. In some embodiments, the polymer is a reaction product of molecules that include an aromatic polyisocyanate. In some embodiments, the polyisocyanate is one or more MDI isomers, an oligomer of one or more MDI isomers, one or more isomers of TDI, isophorone diisocyanate, or combinations of two or more of the foregoing. As used throughout this application, "oligomer" shall mean a polymer containing 2-15 repeating units.

Some examples of polyols suitable for use in formulating the polyurethanes or polyureas of the present invention include polyols of polyesters (e.g. condensation polyester polyols produced by reacting aliphatic or aromatic dicarboxylic acids or mixtures of the two with diols, lactone-type polyester polyols produced by ring opening polymerization of ε-caprolactone or the like), polyether polyols (e.g. poly (ethylene glycol) and poly(propylene glycol), modified polyether polyols, and polytetramethylene ether glycol), and polyols of polyolefins, polyacetals, polythioethers, polyethercarbonates, poly(ethylene terephthalate), polyesteramides, polycaprolactams, polycarbonates, polycaprolactones and polyacrylates, in each case having two or more hydroxyl groups. In some embodiments, the polyurethane or polyurea is a reaction product of reactants that include a polyether polyol or a polyester polyol. Some examples of polyether polyols include diols that are the reaction products of ethylene oxide or propylene oxide with diethylene glycol, triols that are the reaction products of ethylene oxide or propylene oxide with a triol such as glycerin, or a polyol that is a reaction product of ethylene or propylene oxide with polyol compounds such as sucrose, sorbitol, quadrol, and castor oil.

Some examples of polyamines that can be used to formulate polyurethanes or polyureas of the present invention include polyamines of polyethers, polyesters, polyolefins, polyacetals, polythioethers, polyethercarbonates, poly(ethylene terephthalate), polyesteramides, polycaprolactams, polycarbonates, polycaprolactones and polyacrylates, in each case having two or more amine groups. In some embodiments, the polyamines are polyethers have two or three primary amine groups.

Chain extenders are compounds that will react with two or more isocyanate moieties to form a bond. Examples are compounds having at least two reactive hydrogens (that is, hydrogen atoms reactive toward isocyanate groups), such as compounds which carry two or more reactive OH groups, SH groups, NH groups, NH$_2$ groups and CH-acidic groups, (e.g. beta-diketo groups). Any useful chain extender may be used.

For example, the chain extender may be a diol. Examples of diols include ethylene glycol, 1,2- or 1,3-propanediol, 1,2-, 1,3- or 1,4-butanediol, 1,2-, 1,3-, 1,4- or 1,5-pentanediol, 1,2-, 1,3-, 1,4-, 1,5- or 1,6-hexanediol, neopentyl hydroxypivalate, neopentyl glycol, dipropylene glycol, diethylene glycol, 1,2-, 1,3- or 1,4-cyclohexanediol, 1,2-, 1,3- or 1,4-cyclohexanedimethanol, trimethylpentanediol, ethylbutylpropanediol, the positionally isomeric diethyloctanediols, 2-butyl-2-ethyl-1,3-propanediol, 2-butyl-2-methyl-1,3-propanediol, 2-phenyl-2-methyl-1,3-propanediol, 2-propyl-2-ethyl-1,3-propanediol, 2-di-tert-butyl-1,3-propanediol, 2-butyl-2-propyl-1,3-propanediol, 1-dihydroxymethylbicyclo [2.2.1]heptane, 2,2-diethyl-1,3-propanediol, 2,2-dipropyl-1, 3-propanediol, 2-cyclohexyl-2-methyl-1,3-propanediol, 2,5-dimethyl-2,5-hexanediol, 2,5-diethyl-2,5-hexanediol, 2-ethyl-5-methyl-2,5-hexanediol, 2,4-dimethyl-2,4-pentanediol, 2,3-dimethyl-2,3-butanediol, 1,4-bis(2'-hydroxypropyl)benzene, and 1,3-bis(2'-hydroxypropyl)benzene. Chain extenders may also be hydrazine or polyamines such as diamines. Examples of diamines include aliphatic diamines, aromatic diamines and alicyclic diamines. Specific examples of diamines include methylenediamine, ethylenediamine, propylenediamine, 1,4-butylenediamine, cadaverine (1,5-diaminopentane), 1,6-hexamethylenediamine, isophoronediamine, piperazine, 1,4-cyclohexyldimethylamine, 4,4'-diaminodicyclohexylmethane, and aminoethylethanolamine, 2,2,4-trimethylhexamethylenediamine, 2,4,4-trimethylhexamethylene diamine, octamethylenediamine, m- or p-phenylenediamine, 1,3- or 1,4-xylylenediamine, hydrogenated xylylenediamine, bis(4-aminocyclohexyl)methane, '4,4'-methylene bis-(ortho-chloroaniline), di-(methylthio)toluenediamine, diethyl toluene diamine, N,N'-dibutylamino diphenylmethane, diethyltoluenediamine and' bis(4-amino-3-methylcyclohexyl)methane]. Chain extenders may also have two or more different types of groups that react with isocyanates, such as compounds having both one or more amine groups and one or more hydroxyl groups (e.g. ethanolamines, hydrazinoethanol or 2-[(2-aminoethyl)amino]ethanol). In some embodiments, the polyurethane or polyurea is the reaction product of molecules that include a chain extender selected from 1,4-butane diol, 1,3-butane diol, 4,4' methylene bis(2-chloroaniline), diethyl toluene diamine, N,N'-dibutylamino diphenylmethane, and dimethylthiotoluenediamine (DMTDA) (present as the isomer 3,5-dimethylthio-2, 6-toluenediamine, 3,5-dimethylthio-2, 4-toluenediamine) or a combination thereof.

In some embodiments the polyurethane or polyurea is the reaction product of molecules that include: one or more aromatic or aliphatic polyisocyanates; one or more polyether or polyester polyols or polyamines; and one or more diamine or diol chain extenders. In some embodiments the polyurethane or polyurea is the reaction product of molecules that include one or more aromatic diisocyanates, one or more polyether polyols, and one or more diamine or diol chain extenders. In some embodiments, the aromatic diisocyanate is an isomer of TDI, MDI or an oligomer of MDI.

In some embodiments, the polyurethane or polyurea is the reaction product of molecules that include a polyol having any desired molecular weight, with some examples including between about 500 and about 10,000, between about 1,000 and about 8,000, between about 2,000 and about 4,000, between about 2,500 and about 7,000, between about 2,500 and about 3,500, between about 4,000 and about 7,000, between about 4,500 and about 6,000, between about 2,500 and about 3,500, between about 2,500 and about 3,500, between about 1,000 and about 4,000, between about 200 and about 600, and between about 250 and about 500. The foregoing may be polyether polyols, polyester polyols, combinations thereof, or any other desirable polyols. Such polyols may have any desired number of hydroxyl groups, with some examples being two, ranges such as 2-8, 3-6, 4-10, or any number or smaller range within such groups. In some embodiments, the polyurethane or polyurea is the reaction product of molecules that include a polyether diamine or triamine having primary amine groups and having any desired molecular weight, with some examples including between about 100 and about 300, between about 150 and about 250, between about 400 and about 600, between about 450 and about 550, between about 150 and about 250, between about 1,500 and about 2,500, between about 1,800 and about 2,200, between about 4,500 and about 5,500, and between about 4,800 and about 5,200. In some embodiments, the polyurethane or polyurea is the reaction product of molecules that include both a diamine and a triamine having molecular weights independently selected from the foregoing list. In some embodiments, the polyurethane or polyurea is a reaction product of molecules that include polydisperse polyols or polyamines having weight average molecular weight ($M_w$) values within one or more of the ranges above. Any of the above polyols and polyamines can be combined with reactants that include any desired polyisocyanates, with some examples including diisocyanates and blends of polyisocyanates in which the average number of isocyanate groups per molecule is two, or a range between two and three such as about 2.1 to 2.3, about 2.2 to 2.4, or about 2.6 to 2.8.

The polyurethanes or polyureas of the present invention can also be the reaction product of molecules that include crosslinkers, chain terminators, and other reactants. Some examples of crosslinkers include molecules described above as chain extenders that have three or more reactive hydrogen groups, such as glycerin, quadrol, pentaerythritol, trimethylolpropene, sorbitol, sucrose, triethanolamine and polymers having three or more reactive hydrogen groups (e.g. polyetheramines having three or more amine residues, polymeric triols, etc.). Some examples of chain terminators are molecules having single reactive hydrogens such as monols, monoamines, monothiols, monocarboxylic acids and the like. In some embodiments, the chain terminator is a monol. Some examples of suitable monols include $C_1$ to $C_{12}$ alcohols (i.e. methanol through docecyl alcohol), higher alcohols, polymers such as polyethers and polyesters having one hydroxyl group and residues of molecules such as sucrose or glycerin molecules in which all but one of hydroxyl groups have been replaced with a group lacking a reactive hydrogen.

In some embodiments, the sealant composition contains a polyurethane or polyurea that includes free isocyanate groups, such as isocyanate-terminated prepolymers. The isocyanate groups can react with water (including atmospheric moisture) to form amine groups that react with isocyanate groups on other polyurethane or polyurea molecules to form urea linkages, thereby chemically curing the sealant.

In some embodiments, polyurethane or polyurea sealants are formed by combining two components that react with each other to cure. For example, one component may contain a prepolymer and the other may contain a chain extender. The components react when combined, thereby chemically curing the sealant.

Some examples of commercially available polyurethane sealant products include Bostik GPS1 General Purpose Sealant available from Bostik Inc., Dymonic FC polyurethane sealant from Tremco Inc., Beachwood, Ohio, and Permathane SM7108 urethane sealant from Schnee-Morehead Inc, Irving, Tex.

Acrylic Polymers

As used herein, the term "acrylic polymer" means a polymer that includes residues of a polymerization of molecules selected from esters of acrylic acids, esters of methacrylic acids, or both, and in which residues of one or more molecules selected from esters of acrylic acids, esters of methacrylic acids, and styrene compounds constitute at least about 80% of the monomers by weight of the total weight of compounds polymerized into the polymer. Examples of esters of acrylic and methacrylic ester monomers include $C_1$-$C_{12}$ alkyl acrylates and methacrylates such as methyl acrylate, methyl methacrylate, ethyl acrylate, ethyl methacrylate, isopropyl acrylate, isopropyl methacrylate, n-butyl acrylate, n-butyl methacrylate, isobutyl acrylate, isobutyl methacrylate, hexyl acrylate, 2-ethylhexyl acrylate, 2-ethylhexyl methacrylate, t-butyl acrylate, t-butyl methacrylate, 3,3-dimethylbutyl acrylate, 3,3-dimethyl butyl methacrylate, and lauryl acrylate. In some embodiments, the esters of acrylic acids or methacrylic acids are selected from polymers that are reaction products of polymerization of monomers that include n-butyl acrylate, hydroxyethyl methyl methacrylate, acrylic acid, methacrylic acid, methyl methacrylate or two or more of the foregoing. In some embodiments, copolymers prepared from two or more of the previous monomers are prepared at a molar ratio selected to provide a desired characteristic. For example, in some embodiments copolymers of a butyl acrylate and methyl methacrylate are prepared at a molar ratio selected to provide a polymer with a desired glass transition temperature at a value between those of homopolymers of either of the two monomers. The polymers may be homopolymers or copolymers resulting from polymerization of two or more different monomers.

Acrylic polymers may also include as repeating units the residues of other ethylenically unsaturated monomers. Examples include mono- and polyunsaturated hydrocarbon monomers, vinyl esters (e.g., vinyl esters of $C_1$ to $C_6$ saturated monocarboxylic acids), vinyl ethers, monoethylenically unsaturated mono- and polycarboxylic acids and alkyl esters of these mono- and polycarboxylic acids, (e.g., acrylic acid esters and methacrylic acid esters such as $C_1$ to $C_{12}$ alkyl, and more particularly the $C_1$ to $C_4$ alkyl esters), amino monomers and nitriles, vinyl and vinylidene halides, and amides of unsaturated carboxylic acids.

Some examples of unsaturated hydrocarbon monomers include styrene compounds (e.g., styrene, carboxylated styrene, and alpha-methyl styrene), ethylene, propylene, butylene, and conjugated dienes (e.g., butadiene, isoprene and copolymers of butadiene and isoprene). Some examples of vinyl and vinylidene halides include vinyl chloride, vinylidene chloride, vinyl fluoride and vinylidene fluoride. Some examples of vinyl esters include aliphatic vinyl esters, such as vinyl formate, vinyl acetate, vinyl propionate, vinyl butyrate, vinyl isobutyrate, vinyl valerate, and vinyl caproate, and allyl esters of saturated monocarboxylic acids, such as allyl acetate, allyl propionate and allyl lactate. Some examples of vinyl ethers include methylvinyl ether, ethylvinyl ether and n-butylvinyl ether. Typically vinyl ketones include methylvinyl ketone, ethylvinyl ketone and isobutylvinyl ketone. Some examples of dialkyl esters of monoethylenically unsaturated dicarboxylic acids include dimethyl maleate, diethyl maleate, dibutyl maleate, dioctyl maleate, diisooctyl maleate, dinonyl maleate, diisodecyl maleate, ditridecyl maleate, dimethyl fumarate, diethyl fumarate, dipropyl fumarate, dibutyl fumarate, dioctyl fumarate, diisooctyl fumarate, didecyl fumarate, dimethyl itaconate, diethyl itaconate, dibutyl itaconate, and dioctyl itaconate. Some examples of monoethylenically unsaturated monocarboxylic acids include acrylic acid, methacrylic acid, ethacrylic acid, and crotonic acid. Some examples of monoethylenically unsaturated dicarboxylic acids include maleic acid, fumaric acid, itaconic acid and citraconic acid. Some examples of monoethylenically unsaturated tricarboxylic acids include aconitic acid and the halogen-substituted derivatives (e.g., alphachloracylic acid), and the anhydrides and esters of these acids (e.g., maleic anhydride and citraconic anhydride). Some examples of nitriles of ethylenically unsaturated mono-, di- and tricarboxylic acids include acrylonitrile, α-chloroacrylonitrile and methacrylonitrile. Some examples of amides of these carboxylic acids include unsubstituted amides such as acrylamide, methacrylamide and other α-substituted acrylamides and N-substituted amides obtained by the reaction of the amides of the aforementioned mono- and polycarboxylic acids with and aldehyde (e.g., formaldehyde). Some examples of N-substituted amides include N-methylolacrylamide, N-methylolmethacrylamide alkylated N-methylolacrylamides and N-methylolmethacrylamides (e.g., N-methyoxymethylacrylamide and N-methoxymethylmethacrylamide). Some examples of amino monomers include substituted and unsubstituted aminoalkyl acrylates, hydrochloride salts of amino monomers and methacrylates, such as β-aminoethylacrylate, β-amino-ethyl-methacrylate, dimethylaminomethylacrylate, β-methylaminoethylacrylate, and dimethylaminomethylmethacrylate. Some examples of cationic monomers include α, β-ethylenically unsaturated compounds which can undergo polymerization and contain primary, secondary, or tertiary amino groups, such as, for example, dimethylaminoethyl methacrylate, dimethylaminoneopentyl acrylate, dimethylaminopropyl methacrylate, and tert-butylaminoethyl methacrylate, or organic or inorganic salts thereof, and/or alkylammonium compounds, such as, for example, trimethylammonium-ethyl methacrylate chloride, diallyl-dimethylammonium chloride, β-acetamidodiethylaminoethyl acrylate chloride, and methacrylamidopropyltrimethylammonium chloride. These cationic monomers may be used alone or in combination with the aforementioned monomers, provided that their use is compatible with the polymerization process. Some examples of hydroxy-containing monomers include β-hydroxyethylacrylate, β-hydroxypropylacrylate, γ-hydroxypropylacrylate and β-hydroxyethylmethacrylate.

Some examples of commercially available acrylic sealants include DAP EASY SOLUTIONS Kitchen & Bath Caulk available from DAP, Inc., Baltimore, Md., WHITE LIGHTNING 3006 All Purpose Adhesive Caulk available from Diversified Brands (A division of Sherwin Williams), Cleveland, Ohio, and POLYSEAMSEAL All Purpose Adhesive Caulk available from OSI Sealants, Inc., Mentor, Ohio.

Polysulfides

As used herein, the term "polysulfide" means an organic polymer having repeating sulfide linkages. Examples include the product of reacting an organic dihalide with a sodium disulfide solution. Some examples of organic dihalides include aliphatic dihalides (e.g. bis-chloroethyl-formal) and phenyl dihalides. For example, reacting bis-chloroethyl-formal with a sodium disulfide solution gives a polymer having the structure:

Wherein "n" is the number of monomers in the polymer and "x" is the number of consecutive sulfide linkages in the monomer (x can vary among and between monomers in the same polymer). The resulting high molecular weight polymer can then be reacted into shorter polymers having lower "x" values and terminal thiol groups (for example by reductive treatment with NaSH and Na$_2$SO$_2$ followed by acidification). The result is a liquid, branched polysulfide with terminal thiol end groups, in some embodiments having a molecular weight in the range of about 1000 to about 8000 and an x value of about 2. The liquid polymers can then cured be into elastomeric solids, for example by oxidation of thiol to disulfide links using oxidizing agents, such as lead dioxide, manganese dioxide, p-quinone dioxime, and zinc peroxide. Polysulfide sealants include any polysulfide polymers that are cured to form a solid, rather tough composition. In some embodiments, polysulfide sealants comprise from about 30 to 90 weight % of a polysulfide liquid polymer, about 2 to 50 weight % of a filler, about 2 to 10 weight % of a plasticizer, about 1 to 3 weight % of a moisture scavenger, and from about 6 to 15 weight % total of other ingredients, such as adhesion promoters, solvents, binders and curing agents. One example of methods of making polysulfide sealants is described in U.S. Pat. No. 3,431,239. Polysulfide sealants can be formulated as one-part or two-part curing compositions.

Some examples of polysulfide sealants include THIOPLAST® polysulfide (Akcros Chemicals, Germany); U.S. Pat. No. 4,366,307 sold in complete sealant formulations by PRC-DeSoto International, Inc. of Glendale, Calif., and THIOKOL polysulfides available from Toray Thiokol Co., Ltd.

Silane-Modified Polymer

For purposes of this application, "silane-modified polymer" means a polymer having at least one terminal alkoxysilane. The terminal alkoxysilane has the following structure:

wherein:

$R^2$ is an alkyl group having 1 to 3 carbon atoms. In some embodiments, all $R^2$ are one type of moiety (e.g. all methyl groups, all ethyl groups); in others, the $R^2$ groups differ on a single terminal alkoxysilane.

n is 1, 2, or 3.

m is 0, 1, or 2 and the sum of m and n is 3

Z may be any moiety that does not compromise the function of the molecule.

Y is optionally a linking moiety that is the residue from attaching the silane group to the polymer; if no linking moiety exists, —Y— is a covalent bond attaching the silane group to the polymer.

Some examples of silane-modified polyethers include MS Polymers® (e.g. MS Polymers S203H, S303H, S 227, S327, SAX 427 and Acrylic modified silyl modified polyethers such as MAX 923, MAX 951, MAX 601) available from Kaneka Corporation, Japan. MS Polymers are polyethers end-capped with groups such as methyldimethoxysilane groups. Another example is silane-modified polyurethanes (also know as "SPURs"). SPURS are polymers that include polyurethane chains having silane groups at the ends of the chain. Some SPURS are made by reacting isocyanate-terminated polyurethane prepolymers with an organofunctional silane having a primary amine and three alkoxy groups. Some examples of commercially available SPURS include GE SPUR+ silylated polyurethanes available from GE Bayer Silicones, Leverkusen, Germany.

Thus, the invention relates to compositions containing one or more plasticizers and one or more carboxylic acid compounds. The invention further relates to compositions comprising one or more plasticizers, one or more carboxylic acid compounds and one or more or more aminosilane compounds. The aminosilane compounds may be silane-modified polymers, aminosilane adhesion promoters, aminosilanes drying agents, or combinations thereof. In some embodiments, the composition may comprise aminosilane adhesion promoters and a polymer. The polymer may or may not be a silane-modified polymer.

$C_4$ to $C_8$ alkyl terephthalates

As used throughout this application, "$C_4$ to $C_8$ alkyl terephthalate" means a compound having a structure described by Formula I:

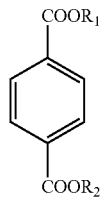

wherein $R_1$ and $R_2$ are each branched or unbranched alkyl or cycloalkyl groups of from 4 to 8 saturated and unsubstituted carbon atoms and wherein $R_1$ and $R_2$ may have identical or differing structures meeting the foregoing description. Any suitable alkyl or cycloalkyl groups can be used, but some examples include 2-ethylhexyl, n-octyl, 2 methyl pentyl, isobutyl, n-butyl, tert-butyl, pentyl, isopentyl, neopentyl, hexyl, heptyl, iso-heptyl and the like. Any such alkyl or cycloalkyl group may be used. In various embodiments, the terephthalate may be selected from a smaller group of terephthalates, such as $C_4$ to $C_7$ alkyl terephthalates, $C_4$ to $C_6$ alkyl terephthalates, $C_6$ to $C_8$ alkyl terephthalates or $C_5$ to $C_8$ alkyl terephthalates, or even smaller groups such as $C_4$ to $C_5$ alkyl terephthalates, $C_5$ to $C_6$ alkyl terephthalates, $C_6$ to $C_7$ alkyl terephthalates or $C_7$ to $C_8$ alkyl terephthalates. In some embodiments, $R_1$ and $R_2$ are both n-butyl groups, making the terephthalate a di-n-butyl terephthalate. In some embodiments, $R_1$ and $R_2$ are both isobutyl groups, making the terephthalate an isobutyl terephthalate. In some embodiments, $R_1$ and $R_2$ are both 2-ethylhexyl groups, making the terephthalate a bis 2-ethylhexyl terephthalate, also commonly referred to di-2-ethylhexyl terephthalate (DEHT) or dioctyl terephthalate (DOTP), which is a component of 168 Plasticizer available from Eastman Chemical Company. In some embodiments, the $C_4$ to $C_8$ alkyl terephthalate is selected from di-n-butyl terephthalate, di-2-ethylhexyl terephtalate and mixtures thereof.

The $C_4$ to $C_8$ alkyl terephthalate may be present in the sealant composition prior to use and in the cured sealant composition. In a two-component sealant, the $C_4$ to $C_8$ alkyl terephthalate may be present in either or both components of the sealant.

It has been found that in some embodiments, use of $C_4$ to $C_8$ alkyl terephthalate compounds as plasticizers in the sealant reduces dirt pickup associated with the sealant. "Dirt pickup" is determined by observing the degree of visible discoloration that occurs due to adherence of dirt to the surface of the sealant as applied. In some embodiments, compositions using $C_4$ to $C_8$ alkyl terephthalate compounds are more resistance to dirt pickup than, for example, compositions using orthophthalate plasticizers.

Mineral Filler

In some embodiments, the sealants contain one the above weight ranges is present with between about 25% and about 90% by weight, based on total weight of the composition, of a mineral filler. In some embodiments, the sealants contain between about 35% and about 70% by weight, based on total weight of the composition, of a mineral filler. As used herein, "mineral filler" refers to mineral substances present in solid particulate or fibrous form that are substantially inert in the sealant system in that they do not undergo chemical reactions with sealant compositions in significant amounts. In some embodiments, fillers modify the strength, permanence or working properties of the sealant, or may simply lower costs by providing a lower cost material that does not unacceptably alter the properties of the sealant. In some embodiments, fillers are selected from carbonates, metal oxides, silicates (e.g. talc, asbestos, clays, mica), sulfates silicon dioxide and aluminum trihydrate. In some embodiments, fillers are selected from carbonates and clays. Some specific examples include ground or light calcium carbonate (with or without a surface-treatment such as a fatty acid, resin acid, cationic surfactant, or anionic surfactant); magnesium carbonate; talc; sulfates such as barium sulfate; alumina; metals in powder form (e.g, aluminum, zinc and iron); bentonite; kaolin clay; quartz powder; and combinations of two or more of the foregoing.

Additional Plasticizers

In some embodiments, the composition contains one or more additional plasticizers in addition to the terephthalates of the present invention. Some examples include: glycerol triacetate (triacetin), 2,2,4-trimethyl-1,3-pentanediol diisobutyrate, phthalate esters (e.g. dioctyl phthalate, di-2-ethyl hexyl phthalate, diisooctyl phthalate, diisononyl phthalate, di-linear nonyl phthalate, di-linear nonyl, undecyl phthalate, di-linear undecyl phthalate, diundecyl phthalate, diisodecylpthalate, $C_6$-$C_{10}$ straight-chain phthalates, $C_7$ linear phthalate, $C_9$ linear phthalate, $C_{11}$ linear phthalate, ditridecyl phthalate, undecyl dodecyl phthalate, di(2-propylheptyl phthalate), nonylundecyl phthalate, texanolbenzylphthalate, polyester phthalate, diallylphthalate, n-butylphthalyl-n-butyl glycosate, dicaprylphthalate, butylcyclohexyl phthalate, dicyclohexyl phthalate or butyl octyl phthalate) dioctyl adipate, di-2-ethyl hexyl adipate, diisonyl adipate, diisooctyl adipate, diisodecyl adipate, di tridecyl adipate, dibutoxyethyl adipate, dibutoxyethoxy adipate, di(n-octyl, undecyl)adipate, polyester adipate, poly glycol adipates, trioctyl trimellitate, tri-2-ethyl hexyl trimellitate, triisooctyl trimellitate, tri isononyl trimellitate, triisodecyl trimellitate, tri-n-hexyl trimellitate, dioctyl azelate, di-2-ethylhexyl glutarate, di-2-ethyl hexyl sebecate, dibutyl sebecate, dibutoxyethyl sebecate, triethyl citrate, acetyl triethyl citrate, tri-n-butyl citrate, acetytri-n-butyl citrate, acetyltri-n-hexyl citrate, n-butyl tri-n-hexyl citrate, isodecyl benzoate, diethylene glycol dibenzoate, dipropylene glycol dibenzoate, triethylene glycol dibenzoate 1,4 cyclohexane dimethanol dibenzoate, 2,2,4 trimethyl-1,3 pentane diol dibenzoate, 2,2,-dimethyl-1,3 propanediol dibenzoate, $C_{10}$-$C_{21}$ alkane phenol esters or alkyl sulphonic phenol ester, acetic acid reaction products with fully hardened castor oil, pentaerythritol tetrabenzoate, glycerol tribenzoate, polypropylene glycol dibenzoate, triarylphosphates, diisononyl cyclohexane 1,2 dicarboxylate, polymers of adipic acid/phthalates/adipates/sebecates/with glycols and often acid terminated, butyl benzyl phthalate, alkylbenzyl phthalate, $C_7$-$C_9$ butyl phthalate, diethylene glycol dibenzoate, di propylene glycol dibenzoate, 2-ethylhexyl benzoate, $C_9$ benzoates, $C_{10}$ benzoates, texanolbenzoate, ethylene glycol dibenzoate, propylene glycol dibenzoate, triethylene glycol dibenzoate, diheptyl phthalate, dihexyl phthalate, dimethyl phthalate, diethyl phthalate, dibutyl phthalate, diisobutyl phthalate, and combinations of any of the foregoing. When used, the additional plasticizer in the sealant compositions of the present invention, can be selected and used according to the intended purpose, such as physical properties modification or appearance modification. In some embodiments involving di-2-ethylhexyl terephthalate, the additional plasticizer is 2,2,4-trimethyl-1,3-pentanediol diisobutyrate.

Other Components

The compositions of the present invention may include any other desirable components. Fillers are discussed above. Some examples of other possible additional components include pigments, dyes, colorants, solvents, curing agents, freeze-thaw stabilizers, thickeners or rheology modifiers, antisagging or antislumping agents, surface active agents (surfactants), preservatives, dispersants, defoamers, adhesion promoters, wet strength additives, ultraviolet absorbers, fire retardants, antioxidants, tackifiers, anti-bacterial and/or anti-fungal materials, biocides, pH adjusting agents, curing catalysts, physical property modifiers and combinations of the foregoing. Some examples of antisagging agents include hydrogenated castor oil derivatives; metal soaps such as calcium stearate, aluminum stearate, barium stearate, and combinations thereof. Some examples of physical property modifiers include silane coupling agents (e.g. alkylalkoxysilanes), silicone varnishes, and polysiloxanes and combinations of two or more of the foregoing. Some examples of tackifiers include epoxy resins, phenol resins, various silane coupling agents, alkyl titanates, and aromatic polyisocyanates and combinations of two or more of the foregoing. Some examples of solvents include: water; aromatic hydrocarbon solvents such as toluene and xylene; ester solvents such as ethyl acetate, butyl acetate, amyl acetate and cellosolve acetate; and ketone solvents such as methyl ethyl ketone, methyl isobutyl ketone and diisobutyl ketone and combinations of two or more of the foregoing. Some examples of curing catalysts include: titanate esters such as tetrabutyl titanate and tetrapropyl titanate; organotin compounds such as dibutyltin dilaurate, dibutyltin maleate, dibutyltin diacetate, stannous octoate and stannous naphthenate; lead octoate; amine compounds such as butylamine, octylamine, dibutylamine, monoethanolamine, diethanolamine, triethanolamine, diethylenetriamine, triethylenetetramine, oleylamine, octylamine, cyclohexylamine, benzylamine, diethylaminopropylamine, xylylenediamine, triethylenediamine, guanidine, diphenylguanidine, 2,4,6-tris(dimethyl-aminomethyl)phenol, morpholine, N-methylmorpholine and 1,3-diazabicyclo[5.4.6]undecene-7, and carboxylic acid salts and other salts thereof; low-molecular-weight polyamide resins obtained from an excess of a polyamine and a polybasic acid; reaction products from an excess of a polyamine and an epoxy compound; and amino-containing silane coupling agents such as γ-aminopropyltrimethoxysilane and N-(β-aminoethyl)aminopropylmethyldimethoxysilane and combinations of two or more of the foregoing. Some examples of thickeners include poly(ox-1,2-ethanediyl)-alpha-hydro-omega-hydroxy polymer with oxy-1,2-ethanediyl-alpha-hydro-omega-hydroxy-nonyl-phenoxyglycidyl ether oligomers and 5-isocyanato-1-(iso-cyanatomethyl)-1,3,3-trimethylcyclohexane or hydroxyethyl cellulose or polyacrylic acid polymers and copolymers and combinations of two or more of the foregoing. Some examples of antioxidants include phenolic antioxidants having a radical chain inhibitor function, such as 2,6-di-tert-butyl-p-cresol, 2,6-di-tert-butylphenol, 2,4-dimethyl-6-tert-butylphenol, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetrakis[methylene-3-(3,5-di-tert-butyl-4-hydroxyphenyl)propionate]methane, and 1,1,3-tris(2-methyl-4-hydroxy-5-tert-butylphenyl)butane and amine type antioxidants (e.g. phenyl-β-naphthylamine, α-naphthylamine, N,N'-di-sec-butyl-p-phenylenediamine, phenothiazine, and N,N'-diphenyl-p-phenylenediamine) and combinations of two or more of the foregoing.

Other components may include, for example, components that promote dehydration if this can be done without unacceptably compromising other favorable sealant properties. In some embodiments, dehydration may be accomplished by adding an isocyanate compound to thereby cause reaction with water. Lower alcohols such as methanol or ethanol or an alkoxysilane compound may be added to improve storage stability. Any useful and desired combinations of components may be used.

Articles

The invention further includes articles comprising the sealants of the present invention. The articles may include, for example, an article to which a composition of the present invention has been applied as a sealant or any article having two or more members or components that are attached or adjacent to one another and have the composition disposed at the juncture or connection of the components, for example in a manner to affix the components to one another or to act as a sealant at the juncture or connection or any space around or adjacent to such connection. Examples of such articles include one or more architectural members or portions thereof (e.g. windows, paved structures), aircraft components, watercraft components, and automotive parts.

Methods

The invention further includes methods of formulating the compositions of the present invention. In some embodiments, the method includes combining at least one $C_4$ to $C_8$ alkyl terephthalate and at least polymer.

Methods of using the sealant compositions are also within the invention. In some embodiments, the sealant composition is applied to an article, an opening in an article, or a juncture, joint, or connection between two or more articles. Any effective methods can be used, and several are known in the art. The invention also includes methods of sealing a location by applying the sealant compositions of the invention the location. In some embodiments, the location is an opening located at the junction of two or more architectural members and sealing the location comprises obstructing the opening.

EXAMPLES

Comparative Examples 1-3

Three (3) comparative acrylic latex sealant compositions were prepared having the following constituents:
1. 337 parts of acrylic latex (UCAR acrylic latex 163 S available from Dow Chemical Company);
2. 9 parts ethylene glycol;
3. 6 parts surfactant (TRITON X-405 available from Dow Chemical Company);
4. 12 parts mineral spirits;
5. 23 parts water;
6. 9 parts adhesion promotor (SILQUEST A-187 available from GE Advanced Materials);
7. 6 parts titanium dioxide;
8. 523 parts calcium carbonate; and
9. 78 parts of the plasticizer:
   a. SANTICIZER 160, a plasticizer product containing butyl benzyl phthalate from Ferro Corporation, Cleveland, Ohio (Comparative Example 1);
   b. JAYFLEX 77, a plasticizer product containing diisoheptyl phthalate from ExxonMobil Chemical, Houston, Tex.; (Comparative Example 2); and c. BENZOFLEX 9088, a plasticizer product containing dipropylene glycol dibenzoate from Velsicol Chemical Corporation, Rosemont, Ill. (Comparative Example 3).

Preparation of the Sealant Composition

In a one-gallon container (454 ml) the liquid components (1)-(6) and the specified plasticizer were added together. This mixture was then mixed using a Cowles mixer for about one minute or until no separation was observed in the mixture, whichever occurred first. The $TiO_2$ was then added to the first mixture and mixed until dispersed (second mixture). The $CaCO_3$ was then slowly added to the second mixture under constant stirring until a homogenous mixture was observed (final mixture). After mixing was complete, final mixture was placed under a vacuum for about 10 minutes to remove air bubbles entrapped due to high speed mixing. The resulting sealant was then transferred to a re-sealable container and the lid securely fastened to prevent evaporation of the water.

Examples 4-6

A sealant composition in accordance with the present invention was prepared following the procedure specified for Comparative Examples 1-3 above. The amount of each constituent (1)-(8) was as specified above. However, the plasticizer (9) differed. In Example 4, the plasticizer was 78 parts of a composition containing at least 96% di-n-butyl terephthalate by weight. Di-n-butyl terephthalate is a terephthalate in which the $R_1$ and $R_2$ groups in Formula I are each n-butyl groups. In Example 5, the plasticizer was 78 parts of EASTMAN 168 PLASTICIZER, a product available from Eastman Chemical Company containing at least 96% DEHT. In Example 6, the plasticizer was 78 parts of a blend having 1:1 parts of dioctyl terephthalate and di-n-butyl terephthalate.

Various tests were performed on each sealant.

Viscosity was measured using a TA AR2000 viscometer (available from TA Instruments, New Castle, Del. The 0.5° cone was used to measure the viscosity over a shear range of 0 to 100/seconds. The measurements were taken at 10/seconds, 30/seconds and 100/seconds for each formulation. The results (in Pascals/second) are presented in Table 1 below.

Hardness was measured using a Shore 00 hardness gauge (Type 00, Model 1600, available from Rex Gauge Company Inc., Buffalo Grove, Ill.). Each sealant was poured into an open container and allowed to cure for 3 days at room temperature. Five measurements were taken for each sealant and the numbers were then averaged. The results are presented Table 1 below.

Tensile strength and elongation were measured for each sealant. Drawdowns (i.e. thin layers of material) having dimensions of 6 inches by 6 inches by 0.0625 inches thick (15.24 cm by 15.24 cm by 0.159 cm) of each sealant were made and allowed to cure for 3 days at room temperature. Tensile strength and elongation were measured in accordance with ASTM-D412 (2002) methodology. The results are presented Table 1 below.

The weight loss from each sealant after one week was determined. Weight loss can be an indicator as to whether a sealant may harden and crack over time. Each sealant was poured into an open container and allowed to cure for 3 days at room temperature. The sealant was then placed in an oven at 50° C. for one week. Weight of the sealant immediately before and after heating were compared. The results are presented Table 1 below.

Extrudability of the sealant from a tube was determined by placing an equal amount (approximately. 100 g) of each sealant into separate equal sized tubes. Care was taken to avoid introducing air pockets into the tube. Each tube was loaded into an air powered CAULK MASTER caulking gun available from Cooper Tools and set at 20 psi. The tip of each tube was cut to give an approximate opening of about ¹⁄₁₆ of an inch in diameter (0.16 cm). The trigger of the caulking gun was depressed for 10 seconds. The weight of the sealant extruded was then measured. The results are presented Table 1 below.

Glass transition temperature (Tg) was determined for each of the sealants by Dynamic Mechanical Analysis (DMA). Samples having a thickness of 1.5 mm to 2.0 mm were drawn down on aluminum panels and allowed to cure for 1 month. Samples were then submitted for DMA analysis using an ARES RDA3 (serial #4800-0026) rheometer available from TA Instruments, New Castle, Del., US. Samples were first preheated over the range of –80° C. to 120° C. to condition the sample. A second heating (over a range of –80° C. to 200° C.) was then conducted and Tg was calculated based on readings during the second heating. (Comparative Examples 10 and 11 and Examples 12 and 13 only). Frequency was 10 radians/second, auto-strain range was 0.5% to 5.0%, temperature ramp rate was 6° C./minute, and time per measurement was 20 seconds.

The results from various tests are presented Table 1 below. Tg for sealant alone with no plasticizer was –3° C.

Dirt pick-up was tested for Comparative Examples 1 and 2 and Example 5. Draw downs having dimensions of 5 inches by 1½ inch by ⅛ inch were made on flat aluminum plates (having dimensions of approximately 3 inches by 6 inches). Separate draw downs for each sample were cured at room temperature for 100 and 200 days each. Uncured samples were also tested. Samples of the same age for all tested Examples (and Comparative Examples) were tested together in a single chamber. For the test, the aluminum plates containing all of the draw downs being tested were suspended together in a random array from the ceiling of a box chamber 1.5 feet high and having a base that was two feet square. The box chamber was made of acrylic plastic on all sides and on the ceiling, and had a wire gauze floor. The wire gauze floor was covered in potting soil purchased at a local store was placed on of the chamber. A SEARS CRAFTSMAN wet & dry vacuum cleaner was then used to blow air upward through the gauze and so as to blow the dirt around the panels for 2 minutes. Discoloration due to dirt adhering to the surface of the samples was then observed and photographed. Results are presented in FIG. 1. Terephthalate plasticizers showed improved resistance to dirt pickup.

TABLE 1

| Test | Comp Ex. 1 | Comp Ex. 2 | Comp Ex. 3 | Example 4 | Example 5 | Example 6 |
|---|---|---|---|---|---|---|
| Viscosity at | | | | | | |
| a. 10/sec. | a. 110 | a. 93 | a. 92 | a. 116 | a. 103 | a. 86 |
| b. 30/sec. | b. 30 | b. 40 | b. 38 | b. 42 | b. 39 | b. 45 |
| c. 100/sec. | c. 11 | c. 14 | c. 14 | c. 12 | c. 12 | c. 16 |
| Hardness | 62 | 64 | 65 | 63 | 71 | 46 |
| Tensile strength | 101 psi | 109 psi | 126 psi | 106 psi | 122 psi | 121 psi |
| Elongation | 190% | 112% | 205% | 161% | 174% | 223% |
| Weight loss | 5.2% | 5.4% | 5.7% | 5.8% | 5.6% | 5.5% |
| Extrudability (grams/second) | 3.6 | 4.9 | 3.5 | 5.3 | 7.1 | 8.4 |
| Tg | –28° C. | –30° C. | –26° C. | –33° C. | –16° C. | — |

Comparative Examples 7-8

Two (2) comparative modified silane sealant compositions were prepared having the following constituents:

1. 100 parts of silyl terminated polyether polymer (S303H available from Kaneka); a liquid polymer that provides the backbone for the modified silane sealant and cures by reacting with moisture in the air polymer);
2. 43 parts of silyl terminated polyether polymer (S203H available from Kaneka);
3. 229 parts of calcium carbonate having a mean particle size of 0.7 microns and surface treated for viscosity stability, (OMYACARB UFT available from Omya);
4. 77 parts of calcium carbonate having a mean particle size of 3 microns and surface treated for viscosity stability (HUBERCARB Q3T available from Huber Corporation);
5. 29 parts titanium dioxide;
6. 2.9 parts of a polyamide wax (DISPARION 6500; a thixotropic additive available from King Industries);
7. 4.3 parts of a moisture scavenger (SILQUEST A-171 silane available from GE Advanced Materials);
8. 4.3 parts of an aminopropyltrimethoxysilane adhesion promoter (SILQUEST A-1120 silane available from GE Advanced Materials);
9. 2.9 parts of a tin based catalyst (U-220 available from Kaneka) 10. 129 parts of a plasticzer component:
   For Comparative Example 7, JAYFLEX DIDP, a plasticizer product containing diisodecyl phthalate from ExxonMobil Chemical, Houston, Tex. diisodecyl phthalate (DIDP), an ortho phthalate; and
   For Comparative Example 8, JAYFLEX DIOP, a plasticizer product containing diisooctyl phthalate (DIOP) available from ExxonMobil Chemical, Houston, Tex., an orthophthalate.

Preparation of the Sealant Composition

On a sheet of aluminum foil, the specified amounts of calcium carbonate were dried in an oven at 100° F. for 4 hours. The specified amounts of the two modified silane polymers were added to a re-sealable, one quart sample jar. The specified plasticizer was then added to the white sample jar and mixed using a Cowles mixer for about 1 minute or until no separation was observed in the mixture, whichever occurred first. The dried Q3T calcium carbonate was slowly added, with stirring, to the white sample jar mixture until a homogenous mixture was observed. The dried UFT calcium carbonate was then slowly added, with stirring, to the white sample jar mixture until a homogenous mixture was observed. The individual constituents (6)-(9) were then slowly added consecutively, with stirring, to the white sample jar mixture until a homogenous mixture was observed. After mixing was complete, final mixture was placed under a vacuum for about 10 minutes to remove air bubbles entrapped due to high speed mixing. The lid on the re-sealable container was securely fastened to prevent premature curing of the material.

Example 9

A sealant composition in accordance with the present invention was prepared following the procedure specified for Comparative Examples 7 and 8 above. The amount of each constituent (1)-(8) was as specified above. However, the sealant composition of the invention was prepared with the following exception, the plasticizer (9) was 129 parts of a composition containing at least 96% di-n-butyl terephthalate.

Various tests were performed on each sealant.

Viscosity was measured using a Brookfield viscometer (available from Brookfield Engineering Labs). The spindle size was a #7 and the viscosity for each formulation was measured at 2.5 and 10 rpm. Samples to be measured were placed in a constant temperature water bath at 25 C for 1 hour prior to measurement. The results, (in Pascals/second), are presented in Table 2 below.

Hardness was measured using a Shore A Hardness gauge from Shore Instrument & Mfg. Co., Freeport N.Y., Model CV. Each sealant first was poured into an open container and allowed to cure for 3 days at room temperature. Five measurements were taken for each sealant and the mean of the numbers was then determined. The results are presented Table 2 below.

Cure depth was determined to see if the plasticizer had any adverse affect on the rate of cure of the sealant. Each sealant was poured into a tin and the thickness of the cure (top down) was measured after curing for 1, 3 and 7 days at room temperature. The cured portion of the sealant was cut from the sample tin and then cut into pieces to measure cured thickness in 3 locations. The thickness was measured in millimeters with a small ruler, to the nearest 0.5 millimeter. The measurement is the mean of the 3 measurements for each time period. The results are presented Table 2 below.

Tensile strength and elongation were measured for each sealant. Drawdowns having dimensions of 6 inches by 6 inches by 0.0625 inches thick (15.24 cm by 15.24 cm by 0.159 cm) of each sealant were made and allowed to cure for 3 days at room temperature. Tensile strength and elongation were measured in accordance with ASTM-D412 methodology. The results are presented Table 2 below.

The weight loss from each sealant after one week was determined. Weight loss is important as an indicator as to whether a sealant may harden and crack over time. Each sealant was poured into an open container and allowed to cure for 3 days at room temperature. The sealant was then placed in an oven at 71° C. for two weeks. Weights before and after heating were compared. The results are presented Table 2 below.

Glass transition temperature (Tg) was determined using the same DMA procedures specified for Comparative Examples 1-3 and Examples 4-6.

TABLE 2

| | Example No. | | |
| --- | --- | --- | --- |
| Test | Comp Ex. 7 | Comp Ex. 8 | Ex. 9 |
| Viscosity at: | | | |
| a. 2.5 rpm | a. 114 | a. 110 | a. 112 |
| b. 10 rpm | b. 44 | b. 41 | b. 38 |
| Hardness | 22 | 20 | 24 |
| Cure depth, day 1/3/7 | 2.2/4/7 | 2.8/6.3/9 | 3/6/9.7 |
| Tensile strength | 248 | 248 | 235 |
| Elongation | 331 | 295 | 273 |
| Weight loss | 0.70% | 0.71% | 1.85% |
| Tg | −62° C. | −64° C. | −66° C. |

Comparative Examples 10 and 11

Two (2) comparative polyurethane sealant compositions were prepared having the following constituents:
1. 100 parts of modified diphenylmethane diisocyanate (MDI) terminated polyether prepolymer (IP-02 available from ITWC Inc.); a liquid polymer that cures by reacting with moisture in the air;

2. 273.9 parts of calcium carbonate having a mean particle size of 0.7 microns and surface treated for viscosity stability, (OMYACARB UFT available from Omya);

3. 19.6 parts titanium dioxide;

4. 5 parts of a thickener, (Aerosil R972, available from Degussa Corp.)

5. 0.5 parts of a moisture scavenger (PTSI, p-Toluenesulfonyl isocyanate, available from Acros Organics)

6. 1.4 parts of an aminopropyltrimethoxysilane adhesion promoter (SILQUEST A-187 silane available from GE Advanced Materials);

7. 0.2 parts of a tin based catalyst (DBTDL, available from Air Products)

8. 20 parts of a plasticizer component:
For Comparative Example 10, JAYFLEX DIDP, a plasticizer product containing diisodecyl phthalate from ExxonMobil Chemical, Houston, Tex. diisodecyl phthalate (DIDP), an ortho phthalate; and
For Comparative Example 11, SANTICIZER 160, a plasticizer product containing butyl benzyl phthalate from Ferro Corporation, Cleveland, Ohio (Comparative Example 1);

The following procedure was used for mixing the polyurethane sealants. Filler & pigment were placed in an aluminum pan and dried overnight at 110° C. to insure dry starting materials. Plasticizers were dried over molecular sieves for at least 2 weeks prior to using. Filler, pigment, and plasticizer are added to Ross VMC-2 Versamix 2 gallon mixer (available from Charles Ross and Son Company, Hauppauge, N.Y., US), the vacuum pump was turned on, and the mixture was slowly heated to 215° F. while stirring. The mixture was then held at 215° F. for 1 additional hour, then cooled to 100° F., at which time stirrers were stopped and the vacuum removed under nitrogen. Prepolymer was then added, and the vacuum and stirring was restarted. While assuring that temperature did not rise above 140° F., mixing continued for one hour after which stirring was stopped and vacuum removed under nitrogen. Adhesion promoter was then added, and the vacuum and mixing was restarted for 15 minutes while assuring that temperature did not rise above 140° F. Vacuum was removed under nitrogen, fumed silica added, and the vacuum and stirrer was restarted and continued for one hour, again monitoring temperature to assure that it remained between 110° F. to 140° F. Stirring was stopped, vacuum removed under nitrogen, and DBTDL catalyst was added. Composition was then stirred under vacuum for 15 minutes without allowing temperature to rise above 120° F. Mixing was then stopped, and vacuum removed under nitrogen, and the mixing kettle was moved. Sealant tubes were then filled using Ross Discharge System sealant pump (available from Charles Ross and Son Company, Hauppauge, N.Y., US) and avoiding exposure to air as much as possible by minimizing disruption of the nitrogen blanket over the sealant.

Example 12

A polyurethane sealant composition in accordance with the present invention was prepared following the procedure specified for Comparative Examples 10 and 11 above. The amount of each constituent (1)-(7) was as specified above. However, the plasticizer (8) was 20 parts of a blend having 75:25 parts of EASTMAN 168 and Eastman TXIB.

Example 13

A polyurethane sealant composition in accordance with the present invention was prepared following the procedure specified for Comparative Examples 10 and 11 above. The amount of each constituent (1)-(7) was as specified above. However, the sealant composition of the invention was prepared with the following exception, the plasticizer (8) was 20 parts of a composition containing at least 96% di-n-butyl terephthalate.

Comparative Examples 14-15

Two (2) comparative polyurethane sealant compositions were prepared having the following constituents:

1. 100 parts of modified diphenylmethane diisocyanate (MDI) terminated polyether prepolymer (20752A, low isocyanate, available from ITWC Inc.); a liquid polymer that cures by reacting with moisture in the air polymer;

2. 273.9 parts of calcium carbonate having a mean particle size of 0.7 microns and surface treated for viscosity stability, (OMYACARB UFT available from Omya);

3. 19.6 parts titanium dioxide;

4. 5 parts of a thickener, (Aerosil R972, a thixotropic additive available from Degussa Corp.)

5. 0.5 parts of a moisture scavenger (PTSI, p-Toluenesulfonyl isocyanate, available from Acros Organics)

6. 1.4 parts of an aminopropyltrimethoxysilane adhesion promoter (SILQUEST A-187 silane available from GE Advanced Materials);

7. 0.2 parts of a tin based catalyst (DBTDL, available from Air Products)

8. 20 parts of a plasticizer component:
For Comparative Example 14, JAYFLEX DIDP, a plasticizer product containing diisodecyl phthalate from ExxonMobil Chemical, Houston, Tex. diisodecyl phthalate (DIDP), an ortho phthalate; and
For Comparative Example 15, SANTICIZER 160, a plasticizer product containing butyl benzyl phthalate from Ferro Corporation, Cleveland, Ohio (Comparative Example 1);

Preparation of the Polyurethane Sealant Composition

The following procedure was used for mixing the polyurethane sealants. Filler & pigment were placed in an aluminum pan and dried overnight at 110° C. to insure dry starting materials. Plasticizers were dried over molecular sieves for at least 2 weeks prior to using. Filler, pigment, and plasticizer are added to Ross VMC-2 Versamix 2 gallon mixer, the vacuum pump was turned on, and the mixture was slowly heated to 215° F. while stirring. The mixture was then held at 215° F. for 1 additional hour, then cooled to 100° F., at which time stirrers were stopped and the vacuum removed under nitrogen. Prepolymer was then added, and the vacuum and stirring was restarted. While assuring that temperature did not rise above 140° F., mixing continued for one hour after which stirring was stopped and vacuum removed under nitrogen. Adhesion promoter was then added, and the vacuum and mixing was restarted for 15 minutes while assuring that temperature did not rise above 140° F. Vacuum was removed under nitrogen, fumed silica added, and the vacuum and stirrer was restarted and continued for one hour, again monitoring temperature to assure that it remained between 110° F. to 140° F. Stirring was stopped, vacuum removed under nitrogen, and DBTDL catalyst was added. Composition was then stirred under vacuum for 15 minutes without allowing temperature to rise above 120° F. Mixing was then stopped, and vacuum removed under nitrogen, and the mixing kettle was moved. Sealant tubes were then filled using sealant pump and avoiding exposure to air as much as possible by minimizing disruption of the nitrogen blanket over the sealant.

Example 16

A sealant composition in accordance with the present invention was prepared following the procedure specified for Comparative Examples 14 and 15 above. The amount of each constituent (1)-(7) was as specified above. However, the plasticizer (8) was 20 parts of a blend having 75:25 parts of dioctyl terephthalate and Eastman TXIB.

Analyses

Various tests were performed on Comparative Examples 10, 11, 14 and 15 as well as Examples 12, 13 and 16 using the following methods:

Extrusion Rate using ASTM method C1183-04;
Rheological Properties (Sag in inches at 50° C., Slump, 50° C., Sag in inches at 4° C. (inches), Slump, 4° C.) using ASTM method C639-01;
Indentation Hardness (Shore A) using ASTM method C661-98;
Effects of Heat Aging on Weight Loss, Cracking and Chalking using ASTM method C1246-00;
Tack Free Time using ASTM method C679-03;
Staining and Color Change using ASTM method C510-05a;
Effects of Laboratory Accelerated Weathering (washout, color change, and low temperature flex cracking) using method ASTM C793-04;
Adhesion and Cohesion using ASTM method C719-93: Test method for Adhesion and Cohesion
Test for Dirt Pick Up. Same procedures used for Comparative Examples 1 and 2 and Example 5, except that the only sample age tested was 30 days.
Glass transition temperature (Tg) was determined (Comparative Examples 10 and 11 and Examples 12 and 13 only) using the same DMA procedures specified for Comparative Examples 1-3 and Examples 4-6.

Results for Dirt Pick Up tests are illustrated by photographs in FIGS. 2 and 3 (and visual observations noted in Tables 3 and 4. All other results are presented in Tables 3 and 4 below.

TABLE 3

Results for Polyurethane Sealants

| | Example # | | | |
|---|---|---|---|---|
| | Comp Ex. 10 | Comp Ex. 11 | Ex. 12 | Ex. 13 |
| ASTM C1183 - Extrudability (ml/min) | 23.99 | 6.98 | 21.78 | 49.48 |
| ASTM C639 - Sag, 50° C. (inches) | 8/16 | 2/16 | 1/16 | 3/16 |
| ASTM C639 - Slump1, 50° C.* | 3 | 0 | 0 | 0 |
| ASTM C639 - Sag, 4° C. (inches) | 3/16 | 0/16 | 0/16 | 1/16 |
| ASTM C639 - Slump, 4° C.* | 2 | 0 | 0 | 0 |
| ASTM C661 - Shore A hardness | 52.4 | 50.7 | 48.5 | 49.9 |
| ASTM C1246 - Weight Loss (%) | 0.57 | 1.43 | 4.97 | 3.53 |
| ASTM C1246 - Cracking or Chalking* | 0 | 0 | 0 | 0 |
| ASTM C679 - Tack Free Time (min) | 47.25 | 28.50 | 29.00 | 52.63 |
| ASTM C510 - Staining* | 1 | 0 | 1 | 0 |
| ASTM C793 - Washout, Color Change* | 1 | 3 | 1 | 1 |
| ASTM C793 - Low Temp Flex Cracking* | 0 | 2 | 0 | 0 |

TABLE 3-continued

Results for Polyurethane Sealants

| | Example # | | | |
|---|---|---|---|---|
| | Comp Ex. 10 | Comp Ex. 11 | Ex. 12 | Ex. 13 |
| ASTM C719 - Adhesion and Cohesion | Pass | Pass | Pass | Not Tested |
| Indoor Dirt Pick-up Rating* | 3 | 3 | 1 | 1 |
| Tg ° C. | −55.58 | −47.62 | −59.60 | −61.70 |

*Rating scale, 0 = no change, 1 = very slight, 2 = slight, 3 = moderate, 4 = severe

TABLE 4

Additional Results for Polyurethane Sealants

| | Example # | | |
|---|---|---|---|
| Sealant | Comp Ex. 14 | Comp Ex. 15 | Ex. 16 |
| ASTM C1183 - Extrudability (ml/min) | 11.45 | 2.84 | 11.01 |
| ASTM C639 - Sag, 50° C. (inches) | 3/16 | 2/16 | 1/16 |
| ASTM C639 - Slump1, 50° C. | 2 | 1 | 0 |
| ASTM C639 - Sag, 4° C. (inches) | 2/16 | 1/16 | 0/16 |
| ASTM C639 - Slump1, 4° C. | 1 | 0 | 0 |
| ASTM C661 - Shore A hardness | 49.0 | 48.4 | 45.8 |
| ASTM C1246 - Weight Loss (%) | 0.93 | 1.54 | 3.89 |
| ASTM C1246 - Cracking or Chalking* | 0 | 0 | 0 |
| ASTM C679 - Tack Free Time (min) | 63.75 | 68.25 | 44.25 |
| ASTM C510 - Staining* | 0 | 0 | 0 |
| ASTM C793 - Washout, Color Change* | 1 | 2 | 1 |
| ASTM C793 - Low Temp Flex Cracking* | 0 | 1 | 0 |
| Indoor Dirt Pick Up Rating* | 3 | 2 | 1 |

1 - Rating scale, 0 = no change, 1 = very slight, 2 = slight, 3 = moderate, 4 = severe Having described the invention in detail, those skilled in the art will appreciate that modifications may be made to the various aspects of the invention without departing from the scope and spirit of the invention disclosed and described herein. It is, therefore, not intended that the scope of the invention be limited to the specific embodiments illustrated and described but rather it is intended that the scope of the present invention be determined by the appended claims and their equivalents. Moreover, all patents, patent applications, publications, and literature references presented herein are incorporated by reference in their entirety for any disclosure pertinent to the practice of this invention.

What is claimed is:

1. A self-curing sealant composition comprising:
at least one polymer selected from acrylic polymers, polyurethanes or polyureas, and silane-modified polymers, between about 35% and about 70% by weight, based on total weight of the composition, of a mineral filler, and at least one $C_4$ to $C_8$ alkyl terephthalate.

2. The self-curing sealant composition of claim 1 wherein at least one $C_4$ to $C_8$ alkyl terephthalate is di-n-butyl terephthalate, di(2-ethylhexyl) terephthalate or a combination of the foregoing.

3. The self-curing sealant composition of claim 1 wherein at least one $C_4$ to $C_8$ alkyl terephthalate is di(2-ethylhexyl) terephthalate, and wherein the composition further comprises 2,2,4-trimethyl-1,3-pentanediol diisobutyrate.

4. The self-curing sealant composition of claim 3 wherein the di(2-ethylhexyl) terephthalate, and the 2,2,4-trimethyl-1, 3-pentanediol diisobutyrate are present in equal amounts.

5. The self-curing sealant composition of claim 1, wherein at least one polymer is a polyurethane or polyurea.

6. The self-curing sealant composition of claim 1, wherein at least one polymer is an acrylic polymer.

7. The self-curing sealant composition of claim 1, wherein at least one polymer is a silane-modified polymer.

8. The self-curing sealant composition of claim 1, wherein the $C_4$ to $C_8$ alkyl terephthalate is present at a weight percent of about 3% to about 25% based on the total weight of the sealant composition.

9. The self-curing sealant composition of claim 1, wherein the $C_4$ to $C_8$ alkyl terephthalate is present at a weight percent of about 15 to about 25% based on the total weight of the sealant composition.

10. The self-curing sealant composition of claim 1, wherein the $C_4$ to $C_8$ alkyl terephthalate is present at a weight percent of about 5 to about 15% based on the total weight of the sealant composition.

11. The self-curing sealant composition of claim 1, wherein the $C_4$ to $C_8$ alkyl terephthalate is present at a weight percent of about 40 to about 60% based on the total weight of the sealant composition.

12. The self-curing sealant composition of claim 1, wherein the composition further comprises di-isoheptyl phthalate, butyl benzyl phthalate, diethylene glycol dibenzoate, dipropylene glycol dibenzoate or triethylene glycol dibenzoate.

13. An article comprising the self-curing sealant composition of claim 1.

14. The article of claim 13, wherein the article comprises two or more members and the self-curing sealant composition is disposed at the junction of two or more members of the article.

15. The article of claim 13, wherein the article comprises an opening, seam, or space, and the self-curing sealant composition is disposed in the opening, seam, or space in a manner that is effective to fill the opening, seam, or space.

16. A method comprising applying a self-curing sealant composition to at least one location under conditions effective to cause the self-curing sealant composition to form a connecting bond between two or more objects, articles or bodies or to fill at least a portion of an opening, junction or other space in, on or between one or more objects, articles or bodies, wherein the self-curing sealant composition comprises:
at least one polymer selected from acrylic polymers, polyurethanes or polyureas, and silane-modified polymers,
between about 35% and about 70% by weight, based on total weight of the composition, of a mineral filler, and
at least one $C_4$ to $C_8$ alkyl terephthalate.

17. The method of claim 16, wherein the at least one location is an opening located at the junction of two or more architectural members and the method comprises obstructing the opening.

18. The method of claim 16, wherein the opening, junction, or other space is a seam between the two or more architectural members, automotive parts, or components of an aircraft, or a watercraft.

19. A method of making a self-curing sealant composition, comprising combining at least the following components:
at least one polymer selected from acrylic polymers, polyurethanes or polyureas, and silane-modified polymers,
between about 35% and about 70% by weight, based on total weight of the composition, of a mineral filler, and
at least one $C_4$ to $C_8$ alkyl terephthalate.

20. The method of claim 19 wherein at least one $C_4$ to $C_8$ alkyl terephthalate is di-n-butyl terephthalate, di(2-ethylhexyl) terephthalate or a combination of the foregoing.

21. The method of claim 19 wherein at least one $C_4$ to $C_8$ alkyl terephthalate is di(2-ethylhexyl) terephthalate, and wherein the composition further comprises 2,2,4-trimethyl-1,3-pentanediol diisobutyrate.

22. The method of claim 19 wherein the di(2-ethylhexyl) terephthalate, and the 2,2,4-trimethyl-1,3-pentanediol diisobutyrate are present in equal amounts.

23. The method of claim 19, wherein at least one polymer is a polyurethane or polyurea.

24. The method of claim 19, wherein at least one polymer is an acrylic polymer.

25. The method of claim 19, wherein at least one polymer is a silane-modified polymer.

26. The method of claim 16 wherein at least one $C_4$ to $C_8$ alkyl terephthalate is di-n-butyl terephthalate, di(2-ethylhexyl) terephthalate or a combination of the foregoing.

27. The method of claim 16 wherein at least one $C_4$ to $C_8$ alkyl terephthalate is di(2-ethylhexyl) terephthalate, and wherein the composition further comprises 2,2,4-trimethyl-1,3-pentanedial diisobutyrate.

28. The method of claim 21 wherein the di(2-ethylhexyl) terephthalate, and the 2,2,4-trimethyl-1,3-pentanediol diisobutyrate are present in equal amounts.

29. The method of claim 16, wherein at least one polymer is a polyurethane or polyurea.

30. The method of claim 16, wherein at least one polymer is an acrylic polymer.

31. The method of claim 16, wherein at least one polymer is a silane-modified polymer.

32. The method of claim 16, wherein the $C_4$ to $C_8$ alkyl terephthalate is present at a weight percent of about 3% to about 25% based on the total weight of the self-curing sealant composition.

33. The method of claim 16, wherein the $C_4$ to $C_8$ alkyl terephthalate is present at a weight percent of about 15 to about 25% based on the total weight of the self-curing sealant composition.

34. The method of claim 16, wherein the $C_4$ to $C_8$ alkyl terephthalate is present at a weight percent of about 5 to about 15% based on the total weight of the self-curing sealant composition.

35. The method of claim 16, wherein the $C_4$ to $C_8$ alkyl terephthalate is present at a weight percent of about 40 to about 60% based on the total weight of the self-curing sealant composition.

36. The method of claim 16, wherein the self-curing sealant composition further comprises di-isoheptyl phthalate, butyl benzyl phthalate, diethylene glycol dibenzoate, dipropylene glycol dibenzoate or triethylene glycol dibenzoate.

37. The self-curing sealant composition of claim 1 wherein at least one $C_4$ to $C_8$ alkyl terephthalate is di-n-butyl terephthalate.

38. The method of claim 16, wherein at least one $C_4$ to $C_8$ alkyl terephthalate is di-n-butyl terephthalate.

39. The method of claim 19, wherein at least one $C_4$ to $C_8$ alkyl terephthalate is di-n-butyl terephthalate.

* * * * *